(12) United States Patent
Zhang et al.

(10) Patent No.: US 12,516,423 B2
(45) Date of Patent: Jan. 6, 2026

(54) HYDROGEN EVOLUTION ELECTRODE AND PREPARATION METHOD THEREOF

(71) Applicant: Chongqing University, Chongqing (CN)

(72) Inventors: Yunhuai Zhang, Chongqing (CN); Di Gao, Chongqing (CN); Peng Xiao, Chongqing (CN)

(73) Assignee: Chongqing University, Chongqing (CN)

( * ) Notice: Subject to any disclaimer, the term of this patent is extended or adjusted under 35 U.S.C. 154(b) by 629 days.

(21) Appl. No.: 18/056,527

(22) Filed: Nov. 17, 2022

(65) Prior Publication Data

US 2023/0203675 A1 Jun. 29, 2023

(30) Foreign Application Priority Data

Dec. 29, 2021 (CN) .......................... 202111633276.X

(51) Int. Cl.

| | |
|---|---|
| *C25B 1/04* | (2021.01) |
| *C25B 11/063* | (2021.01) |
| *C25B 11/075* | (2021.01) |
| *C25B 15/031* | (2021.01) |
| *C25B 15/04* | (2006.01) |
| *C25D 3/56* | (2006.01) |
| *C25D 5/00* | (2006.01) |
| *C25D 5/18* | (2006.01) |

(52) U.S. Cl.
CPC .............. *C25B 1/04* (2013.01); *C25B 11/063* (2021.01); *C25B 11/075* (2021.01); *C25B 15/031* (2021.01); *C25B 15/04* (2013.01); *C25D 3/562* (2013.01); *C25D 5/18* (2013.01); *C25D 5/60* (2020.08)

(58) Field of Classification Search
CPC .............. C25D 5/18; C25D 3/562; C25B 1/04
See application file for complete search history.

(56) References Cited

U.S. PATENT DOCUMENTS

2021/0404073 A1* 12/2021 Kanatzidis ............ C25B 11/091

* cited by examiner

*Primary Examiner* — Brian W Cohen
(74) *Attorney, Agent, or Firm* — DLA Piper LLP (US)

(57) ABSTRACT

The present disclosure provides a hydrogen evolution electrode and a preparation method thereof. The preparation method includes the following steps: providing an electrolyte including $Co(NO_3)_2 \cdot 6H_2O$ with a $Co(NO_3)_2$ concentration of 0.005 mol $L^{-1}$ to 0.015 mol $L^{-1}$, $MnCl_2 \cdot 4H_2O$ with a $MnCl_2$ concentration of 0.005 mol $L^{-1}$ to 0.01 mol $L^{-1}$, KCl with a concentration of 0.003 mol $L^{-1}$ to 0.008 mol $L^{-1}$, and $CH_3CSNH_2$ with a concentration of 0.04 mol $L^{-1}$ to 0.06 mol $L^{-1}$; adjusting the electrolyte to a pH value of 6 to 7; providing a cathode in the form of a substrate; and conducting electrolysis in a cyclic voltammetry mode, thereby preparing the electrode for hydrogen production by water electrolysis through electrochemical deposition of a $Co_{9-x}Mn_xS_8$ nanosheet catalyst on the cathode substrate, where $1 \leq X \leq 7$.

14 Claims, 9 Drawing Sheets

HYDROGEN EVOLUTION ELECTRODE AND PREPARATION METHOD THEREOF

CROSS-REFERENCE TO RELATED APPLICATION

This patent application claims the benefit and priority of Chinese Patent Application No. 202111633276.X, filed Dec. 29, 2021, which is incorporated herein by reference in its entirety.

TECHNICAL FIELD

The present disclosure relates to an electrode for hydrogen production by water electrolysis or a hydrogen evolution electrode.

BACKGROUND

Electrochemical catalysis-based water splitting has become an important way to produce hydrogen. Hydrogen is considered an ideal zero-carbon energy carrier for future energy infrastructures due to a much higher energy density than that of conventional coal and gasoline. Large-scale hydrogen production based on renewable energy is an important part of the energy transformation strategy. The cathodic half-reaction hydrogen reduction requires two elementary steps, the cleavage of O—H bonds and the subsequent formation of H—H bonds, including the transfer of two electrons in a whole process. However, this process requires a slow kinetic overpotential caused by proton-coupled electron transfer, leading to excessive energy consumption. Therefore, it is necessary to continuously develop new energy-saving hydrogen evolution electrodes.

SUMMARY

An objective of the present disclosure is to provide an electrode for hydrogen production by water electrolysis. The electrode has an improved electrochemical catalytic performance.

A first aspect of the present disclosure provides a preparation method of an electrode for hydrogen production by water electrolysis, including the following steps:
providing an electrolyte including $Co(NO_3)_2 \cdot 6H_2O$ with a $Co(NO_3)_2$ concentration of 0.005 mol $L^{-1}$ to 0.015 mol $L^{-1}$, $MnCl_2 \cdot 4H_2O$ with a $MnCl_2$ concentration of 0.005 mol $L^{-1}$ to 0.01 mol $L^{-1}$, KCl with a concentration of 0.003 mol $L^{-1}$ to 0.008 mol $L^{-1}$, and $CH_3CSNH_2$ with a concentration of 0.04 mol $L^{-1}$ to 0.06 mol $L^{-1}$;
adjusting the electrolyte to a pH value of 6 to 7;
providing a cathode in the form of a substrate; and
conducting electrolysis in a cyclic voltammetry mode, thereby preparing the electrode for hydrogen production by water electrolysis through electrochemical deposition of a $Co_{9-x}Mn_xS_8$ nanosheet catalyst on the cathode substrate, where $1 \leq X \leq 7$.

Further, the electrolysis is conducted in the cyclic voltammetry mode by scanning at a potential window of −1 V vs RHE to 1 V vs RHE, preferably −0.619 V vs RHE to 0.781 V vs RHE and a scan rate of 1 mV $s^{-1}$ to 3 mV $s^{-1}$, preferably 2 mV $s^{-1}$ with 5 to 7, preferably 6 scan segments.

Further, the electrolysis is conducted with the electrolyte at a constant temperature of 20° C. to 30° C., preferably 24° C. to 26° C. for 30 min to 40 min, preferably 35 min.

Further, the preparation method further includes providing an anode or a counter electrode that is spaced from the cathode by 2 cm to 5 cm, preferably 2.5 cm.

Further, a titanium substrate is preferably provided as the cathode.

Further, a thickness of the nanosheet in the $Co_{9-x}Mn_xS_8$ catalyst nanosheet array deposited on the cathode is adjusted by controlling a molar ratio of Co and Mn in the electrolyte. For example, when Co and Mn have a molar ratio of 2:1, the nanosheet can be adjusted to an average thickness of 9 nm; when Co and Mn have a molar ratio of 1:1, the nanosheet can be adjusted to an average thickness of 30 nm; when Co and Mn have a molar ratio of 1:2, the nanosheet can be adjusted to an average thickness of 45 nm.

Further, Co and Mn in the electrolyte have a molar ratio of preferably 1:1, namely X is 4.5. In a nanogrid catalyst lattice of the bimetallic sulfide $Co_{9-x}Mn_xS_8$ (x=4.5), due to the proper introduction of $Mn^{2+}$ spin states, it helps to regulate edge sites and promote electron transfer at the boundary of a local structure. Therefore, compared with a monometallic sulfide $Co_9S_8$, the bimetallic sulfide has a superior specific area activity in strongly acidic and strongly alkaline media, thus showing advantages of being applied to a cathode catalyst for hydrogen production by water electrolysis.

Further, in the electrolysis, the electrolyte is preferably always kept still, without any stirring.

Further, the electrolyte is preferably controlled to a pH value of 6.5.

In the present disclosure, cyclic voltammetry scanning at a low scan rate (about 2 mV $s^{-1}$) can optimize kinetics during the deposition; excess $Cl^-$ can coordinate with one or two precursor metal ions, changing thermodynamics during the deposition to promote the co-deposition of transition metals; adsorption of the $Cl^-$ on an electrode surface can change a charge density of an electric double layer on the surface, inhibiting the growth of some crystals to affect a kinetic process of the deposition; and reduction of a mass transfer rate in the electrolyte is favorable for the formation of a $Co_{9-x}Mn_xS_8$ nanosheet array with a smaller monolithic thickness, which significantly promotes a catalytic activity.

Alternatively, the electrolysis can also be conducted in a chronoamperometry mode.

A second aspect of the present disclosure provides an electrode for hydrogen production by water electrolysis prepared by the preparation method.

In the present disclosure, a uniform and regular $Co_{9-x}Mn_xS_8$ nanosheet array is grown in-situ on a titanium sheet substrate by one-step cyclic voltammetry-based electrodynamic deposition, thereby obtaining a hydrogen evolution electrode with a reliable performance.

The present disclosure at least has the following characteristics:
- the size and dispersion of a catalyst nanosheet are effectively controlled by controlling the scan rate of cyclic voltammetry;
- in a single aqueous solvent system, controllable adjustment of the shape and size of $Co_{9-x}Mn_xS_8$ nanogrids can be achieved only by adjusting a single variable such as the concentration of manganese ions; moreover, the product has a regular crystal structure, uniform distribution, and a high phase purity; and
- it overcomes the limitation of high-temperature and high-pressure reaction conditions in traditional thermosynthesis, the difficulty in completely removing a reaction solvent, and the boundedness of precise control for material growth.

In conclusion, the preparation method of one-step cyclic voltammetry-based electrodynamic deposition provided by the present disclosure has a simple process, mild conditions, rapid deposition, and desirable controllability of product shape and size. The electrode has a desirable sheet dispersion, no active agent on the surface, lattice matching between an electrode material and the substrate, excellent repeatability, and a low price. Therefore, the electrode is particularly suitable as a hydrogen evolution cathode in a hydrogen production generator by water electrolysis.

DETAILED DESCRIPTION OF THE EMBODIMENTS

Figure 1:
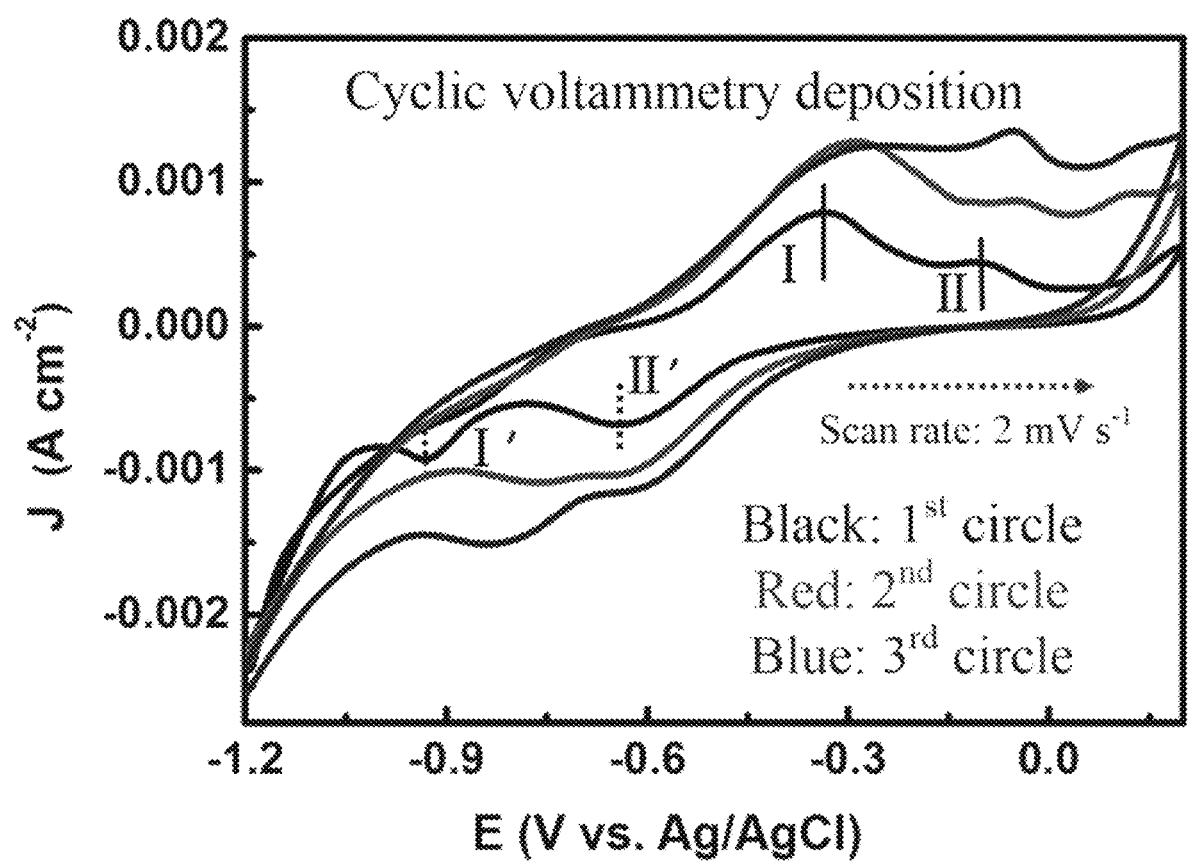
FIG. 1 shows a cyclic voltammetry curve recorded during deposition of a $Co_{9-x}Mn_xS_8$ nanogrid (array) according to the present disclosure.
Figure 2A:
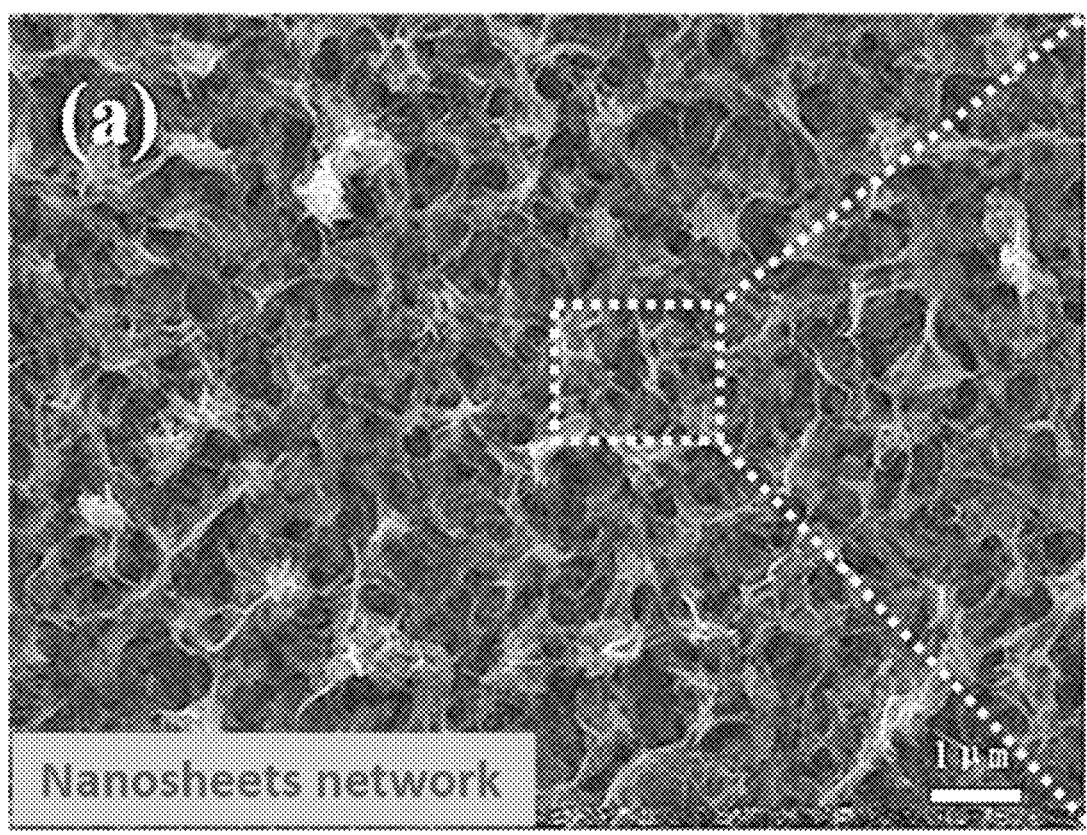
FIG. 2A and FIG. 2B are a scanning electron microscopy (SEM) image of a $Co_{9-x}Mn_xS_8$ (x=3, with a thickness of 9 nm) nanogrid on an electrode prepared according to the present disclosure and a corresponding partially-enlarged annotation image, respectively.
Figure 2B:
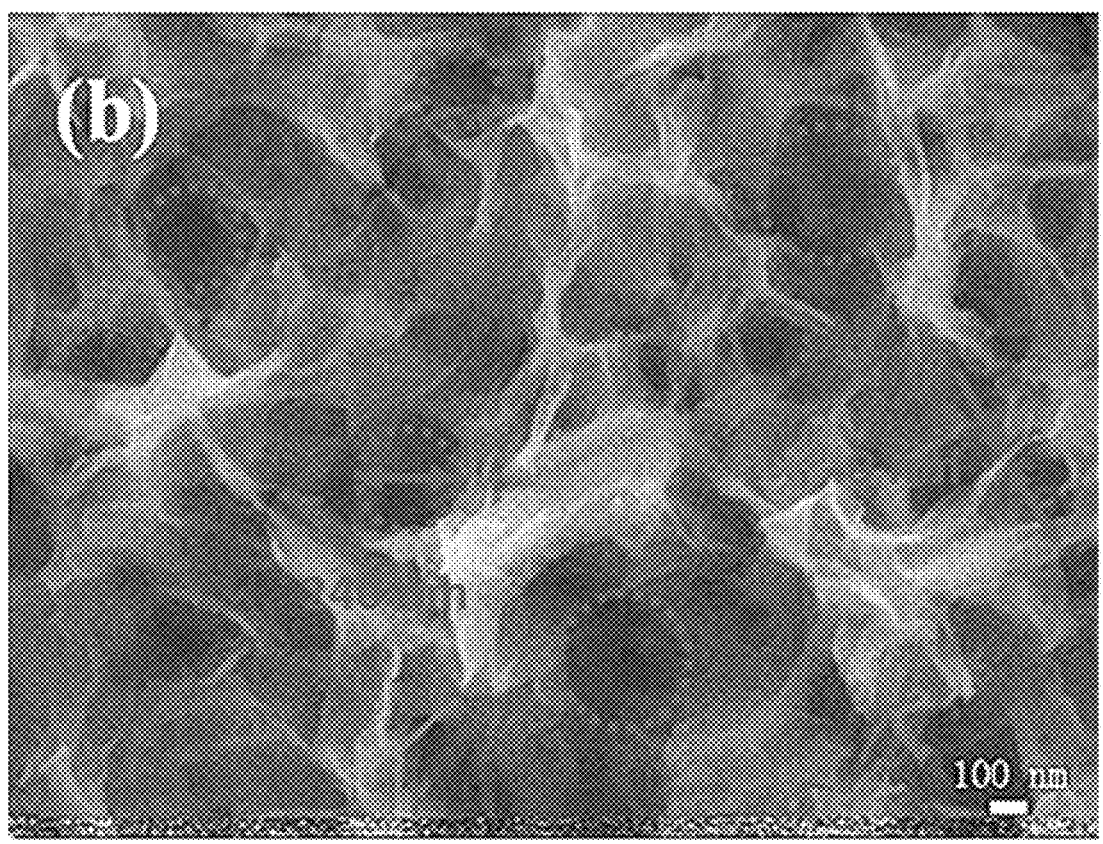
Figure 3A:
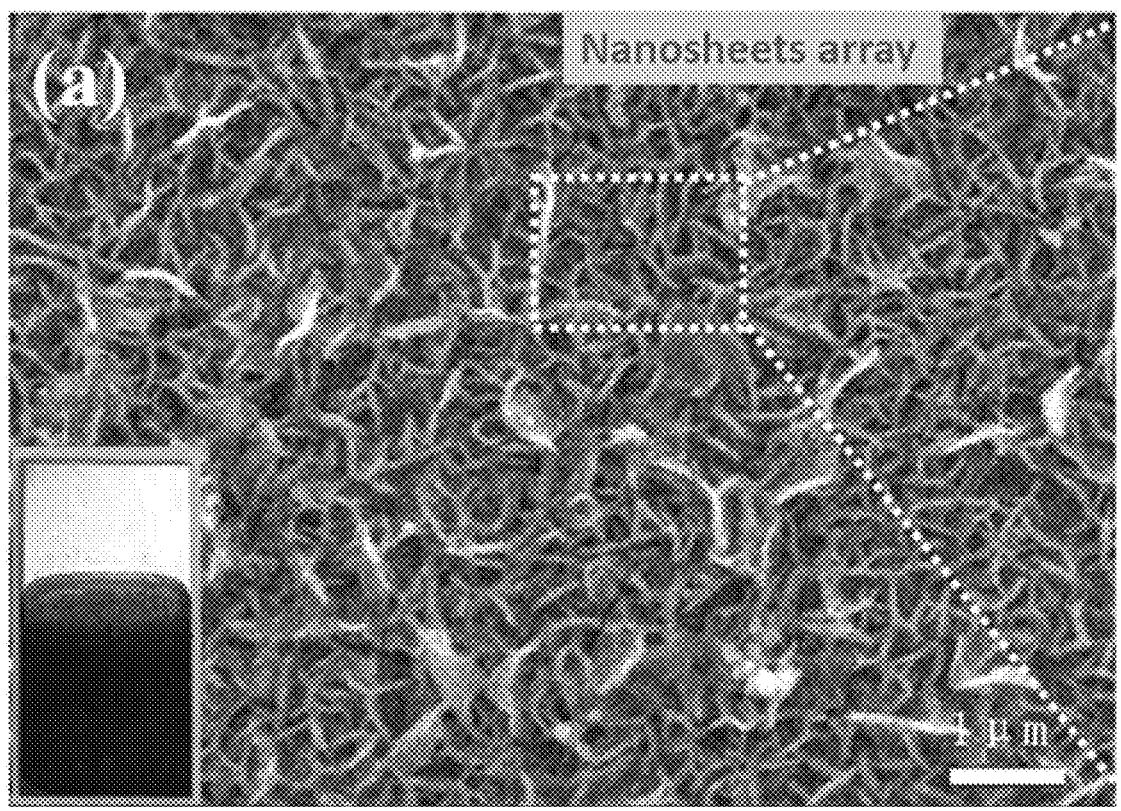
FIG. 3A and FIG. 3B are a SEM image of a $Co_{9-x}Mn_xS_8$ (x=4.5, with a thickness of 30 nm) nanogrid on the electrode prepared according to the present disclosure and a corresponding partially-enlarged annotation image, respectively.
Figure 3B:
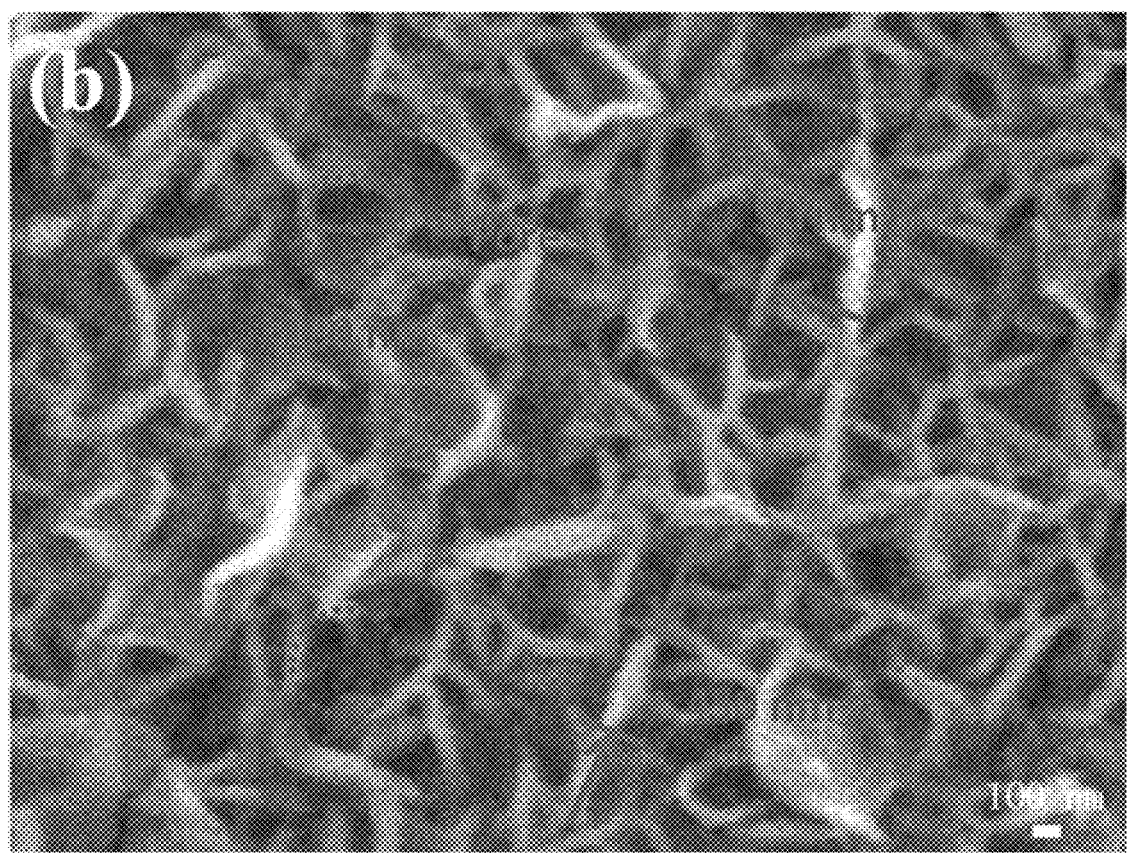

The present disclosure will be further described below with reference to the examples and accompanying drawings. It should be understood by those skilled in the art that the examples and accompanying drawings are only for a better understanding of the present disclosure, and are not used for any limiting purpose.

One-Step Preparation of a $Co_{9-x}Mn_xS_8$ (x=3) Nanosheet Array Grid-Typed Hydrogen Evolution Electrode by Cyclic Voltammetry Slow Electrodynamics Deposition

Example 1

(1) A substrate Ti sheet was pretreated, cut to 1 $cm^2 \times 2$ $cm^2$, placed in 18% dilute hydrochloric acid to conduct an ultrasonic treatment for 20 min, ultrasonically cleaned with absolute ethanol and deionized water for 20 min, and then dried in a stream of nitrogen.

(2) A standard three-electrode system of an electrochemical workstation (CHI660D) was used, with a graphite sheet (2 $cm^2 \times 2$ $cm^2$), a silver/silver chloride (3 M KCl) electrode, and the Ti sheet as a counter electrode, a reference electrode, and a working electrode, respectively; a distance between the substrate Ti sheet and the counter electrode was controlled at 2.5 cm, and an infiltration area was kept at 1 $cm^2 \times 1$ $cm^2$.

(3) A deposition electrolyte was configured, and an electrolytic cell was provided with a mixed solution containing 0.01 mol $L^{-1}$ of $Co(NO_3)_2$, 0.005 mol $L^{-1}$ of $MnCl_2$, 0.0503 mol $L^{-1}$ of $CH_3CSNH_2$, and 0.005 mol $L^{-1}$ of KCl, at a constant temperature of 25° C. with a pH value adjusted to 6.5 with sodium hydroxide, and the electrolyte remained still throughout the deposition.

(4) Under a one-step cyclic voltammetry electrodynamic deposition mode, the electrochemical deposition was conducted at a potential window of -1.2 V vs Ag/AgCl to 0.2 V vs Ag/AgCl and a scan rate of 2 mV $s^{-1}$ with 6 scan segments for 35 min, and a $Co_{9-x}Mn_xS_8$ (x=3) nanogrid was deposited on the Ti substrate to form a uniform black film.

(5) The deposited electrode film was rinsed with deionized water for 3 min, and placed in magnetically-stirring deionized water to remove residual electrolyte on an electrode surface by vortex, and then dried in a vacuum drying box for 10 h to obtain a final product. The $Co_{9-x}Mn_xS_8$ (x=3) nanosheet array was uniformly and vertically distributed on the Ti substrate (forming the electrode) to constitute a grid structure, where the nanosheet had an average thickness of 9 nm and an average pore size of 240 nm.

(6) The dried electrode was placed in 0.5 M $H_2SO_4$ and 1 M KOH media separately, to conduct subsequent electrochemical tests of the cathodic HER by water electrolysis.

Example 2

(1) A substrate Ti sheet was pretreated, cut to 1 $cm^2 \times 2$ $cm^2$, placed in 18% dilute hydrochloric acid to conduct an ultrasonic treatment for 20 min, ultrasonically cleaned with absolute ethanol and deionized water for 20 min, and then dried in a stream of nitrogen.

(2) A standard three-electrode system of an electrochemical workstation (CHI660D) was used, with a graphite sheet (2 $cm^2 \times 2$ $cm^2$), a silver/silver chloride (3 M KCl) electrode, and the Ti sheet as a counter electrode, a reference electrode, and a working electrode, respectively; a distance between the substrate Ti sheet and the counter electrode was controlled at 2.5 cm, and an infiltration area was kept at 1 $cm^2 \times 1$ $cm^2$.

(3) A deposition electrolyte was configured, and an electrolytic cell was provided with a mixed solution containing 0.0075 mol $L^{-1}$ of $Co(NO_3)_2$, 0.0075 mol $L^{-1}$ of $MnCl_2$, 0.0503 mol $L^{-1}$ of $CH_3CSNH_2$, and 0.005 mol $L^{-1}$ of KCl, at a constant temperature of 25° C. with a pH value adjusted to 6.5, and the electrolyte remained still throughout the deposition.

(4) Under a one-step cyclic voltammetry electrodynamic deposition mode, the electrochemical deposition was conducted at a potential window of -1.2 V vs Ag/AgCl to 0.2 V vs Ag/AgCl and a scan rate of 2 mV $s^{-1}$ with 6 scan segments for 35 min, and a $Co_{9-x}Mn_xS_8$ (x=4.5) nanogrid was deposited on the Ti substrate to form a uniform black film.

(5) The deposited electrode film was rinsed with deionized water for 3 min, and placed in magnetically-stirring deionized water to remove residual electrolyte on an electrode surface by vortex, and then dried in a vacuum drying box for 10 h to obtain a final product. The $Co_{9-x}Mn_xS_8$ (x=4.5) nanosheet array was uniformly and vertically distributed on the Ti substrate to constitute a grid structure, the nanosheet had an average thickness of 30 nm and an average pore size of 280 nm.

(6) The dried electrode was placed in 0.5 M $H_2SO_4$ and 1 M KOH media separately, to conduct subsequent electrochemical tests of the cathodic HER by water electrolysis.

Example 3

(1) A substrate Ti sheet was pretreated, cut to 1 $cm^2 \times 2$ $cm^2$, placed in 18% dilute hydrochloric acid to conduct an ultrasonic treatment for 20 min, ultrasonically cleaned with absolute ethanol and deionized water for 20 min, and then dried in a stream of nitrogen.

(2) A standard three-electrode system of an electrochemical workstation (CHI660D) was used, with a graphite sheet (2 $cm^2 \times 2$ $cm^2$), a silver/silver chloride (3 M KCl) electrode, and the Ti sheet as a counter electrode, a reference electrode, and a working electrode, respectively; a distance between the substrate Ti sheet and the counter electrode was controlled at 2.5 cm, and an infiltration area was kept at 1 $cm^2 \times 1$ $cm^2$.

(3) A deposition electrolyte was configured, and an electrolytic cell was provided with a mixed solution containing 0.01 mol $L^{-1}$ of $Co(NO_3)_2$, 0.005 mol $L^{-1}$ of $MnCl_2$, 0.0503 mol $L^{-1}$ of $CH_3CSNH_2$, and 0.005 mol $L^{-1}$ of KCl, at a constant temperature of 25° C. with a pH value adjusted to 6.5, and the electrolyte remained still throughout the deposition.

(4) Under a one-step cyclic voltammetry electrodynamic deposition mode, the electrochemical deposition was conducted at a potential window of −1.2 V vs Ag/AgCl to 0.2 V vs Ag/AgCl and a scan rate of 2 mV $s^{-1}$ with 6 scan segments for 35 min, and a $Co_{9-x}Mn_xS_8$ (x=6) nanogrid was deposited on the Ti substrate to form a uniform black film.

(5) The deposited electrode film was rinsed with deionized water for 3 min, and placed in magnetically-stirring deionized water to remove residual electrolyte on an electrode surface by vortex, and then dried in a vacuum drying box for 10 h to obtain a final product. The $Co_{9-x}Mn_xS_8$ (x=6) nanosheet array was uniformly and vertically distributed on the Ti substrate to constitute a grid structure, the nanosheet had an average thickness of 45 nm and an average pore size of 560 nm.

(6) The dried electrode was placed in 0.5 M $H_2SO_4$ and 1 M KOH media separately, to conduct subsequent electrochemical tests of the cathodic HER by water electrolysis.
One-Step Preparation of a $Co_{9-x}Mn_xS_8$ (x=4.5) Nanosheet Array Grid-Typed Hydrogen Evolution Electrode by Cyclic Voltammetry Rapid Electrodynamics Deposition Comparative Example 4

(1) A substrate Ti sheet was pretreated, cut to 1 $cm^2 \times 2$ $cm^2$, placed in 18% dilute hydrochloric acid to conduct an ultrasonic treatment for 20 min, ultrasonically cleaned with absolute ethanol and deionized water for 20 min, and then dried in a stream of nitrogen.

(2) A standard three-electrode system of an electrochemical workstation (CHI660D) was used, with a graphite sheet (2 $cm^2 \times 2$ $cm^2$), a silver/silver chloride (3 M KCl) electrode, and the Ti sheet as a counter electrode, a reference electrode, and a working electrode, respectively; a distance between the substrate Ti sheet and the counter electrode was controlled at 2.5 cm, and an infiltration area was kept at 1 $cm^2 \times 1$ $cm^2$.

(3) A deposition electrolyte was configured, and an electrolytic cell was provided with a mixed solution containing 0.0075 mol $L^{-1}$ of $Co(NO_3)_2$, 0.0075 mol $L^{-1}$ of $MnCl_2$, 0.0503 mol $L^{-1}$ of $CH_3CSNH_2$, and 0.005 mol $L^{-1}$ of KCl, at a constant temperature of 25° C. with a pH value adjusted to 6.5, and the electrolyte remained still throughout the deposition.

(4) Under a one-step cyclic voltammetry electrodynamic deposition mode, the electrochemical deposition was conducted at a potential window of −1.2 V vs Ag/AgCl to 0.2 V vs Ag/AgCl and a scan rate of 8 mV $s^{-1}$ with 6 scan segments for 9 min, and a $Co_{9-x}Mn_xS_8$ (x=4.5) nanogrid was deposited on the Ti substrate to form a uniform black film.

(5) The deposited electrode film was rinsed with deionized water for 3 min, and placed in magnetically-stirring deionized water to remove residual electrolyte on an electrode surface by vortex, and then dried in a vacuum drying box for 10 h to obtain a final product, where the $Co_{9-x}Mn_xS_8$ (x=4.5) nanosheets were non-uniformly distributed on the Ti substrate to form a grid structure.

(6) The dried electrode was placed in 0.5 M $H_2SO_4$ and 1 M KOH media separately, to conduct subsequent electrochemical tests of the cathodic HER by water electrolysis.
Preparation of a $Co_{9-x}Mn_xS_8$ (x=4.5) Nanosheet Array Grid-Typed Hydrogen Evolution Electrode by Chronoamperometry Deposition Example 5

(1) A substrate Ti sheet was pretreated, cut to 1 $cm^2 \times 2$ $cm^2$, placed in 18% dilute hydrochloric acid to conduct an ultrasonic treatment for 20 min, ultrasonically cleaned with absolute ethanol and deionized water for 20 min, and then dried in a stream of nitrogen.

(2) A standard three-electrode system of an electrochemical workstation (CHI660D) was used, with a graphite sheet (2 $cm^2 \times 2$ $cm^2$), a silver/silver chloride (3 M KCl) electrode, and the Ti sheet as a counter electrode, a reference electrode, and a working electrode, respectively; a distance between the substrate Ti sheet and the counter electrode was controlled at 2.5 cm, and an infiltration area was kept at 1 $cm^2 \times 1$ $cm^2$.

(3) A deposition electrolyte was configured, and an electrolytic cell was provided with a mixed solution containing 0.0075 mol $L^{-1}$ of $Co(NO_3)_2$, 0.0075 mol $L^{-1}$ of $MnCl_2$, 0.0503 mol $L^{-1}$ of $CH_3CSNH_2$, and 0.005 mol $L^{-1}$ of KCl, at a constant temperature of 25° C. with a pH value adjusted to 6.5, and the electrolyte remained still throughout the deposition.

(4) Under a one-step chronoamperogalvanic deposition mode, the electrochemical deposition was conducted at a constant potential of −0.6 V vs Ag/AgCl for 10 min, and a $Co_{9-x}Mn_xS_8$ (x=4.5) nanogrid was deposited on the Ti substrate to form a uniform black film.

(5) The deposited electrode film was rinsed with deionized water for 3 min, and placed in magnetically-stirring deionized water to remove residual electrolyte on an electrode surface by vortex, and then dried in a vacuum drying box for 10 h to obtain a final product.

(6) The dried electrode was placed in 0.5 M $H_2SO_4$ and 1 M KOH media separately, to conduct subsequent electrochemical tests of the cathodic HER by water electrolysis.

Figure 4A:
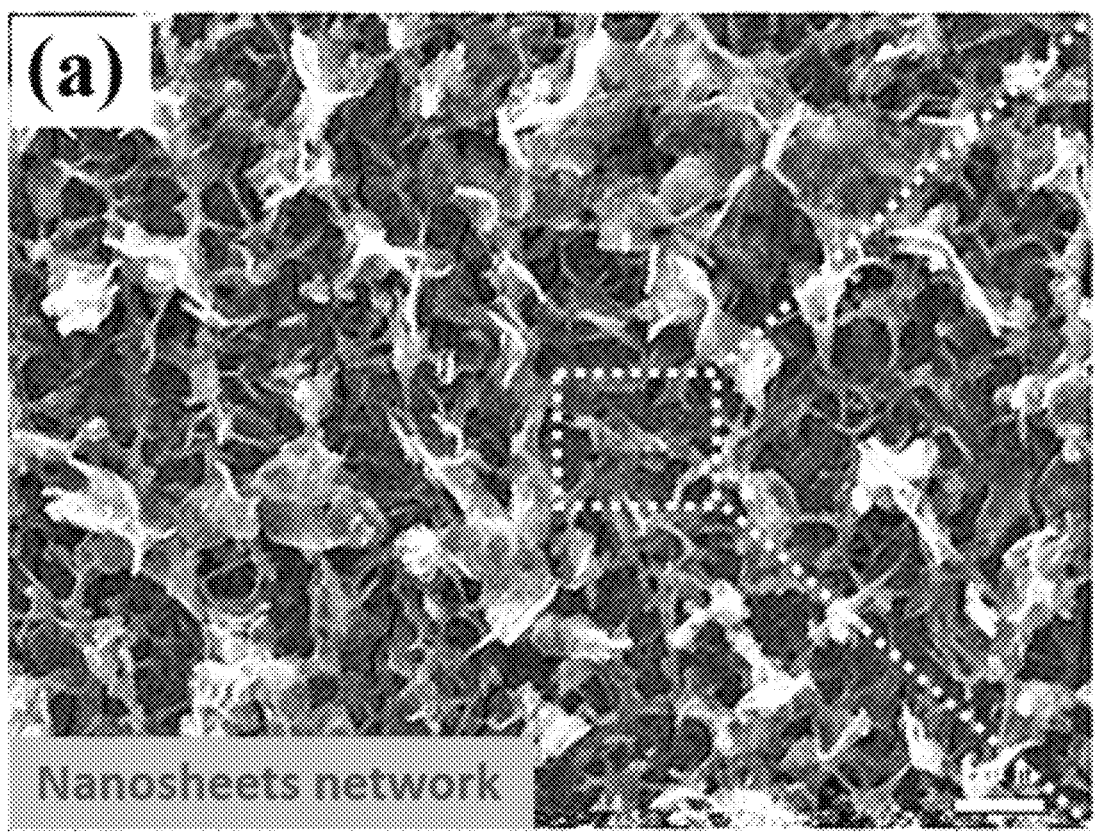
FIG. 4A and FIG. 4B are a SEM image of the $Co_{9-x}Mn_xS_8$ (x=6, with a thickness of 45 nm) nanogrid on the electrode prepared according to the present disclosure and a corresponding partially-enlarged annotation image, respectively.
Figure 4B:
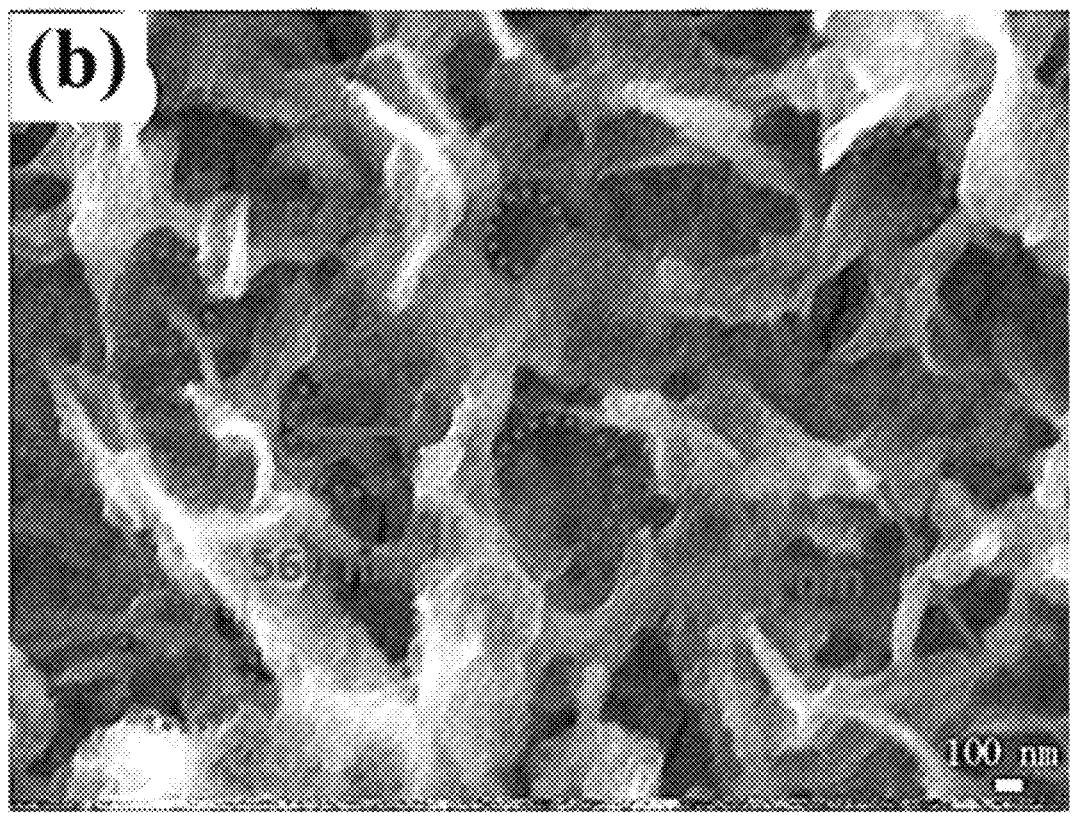
Figure 5:
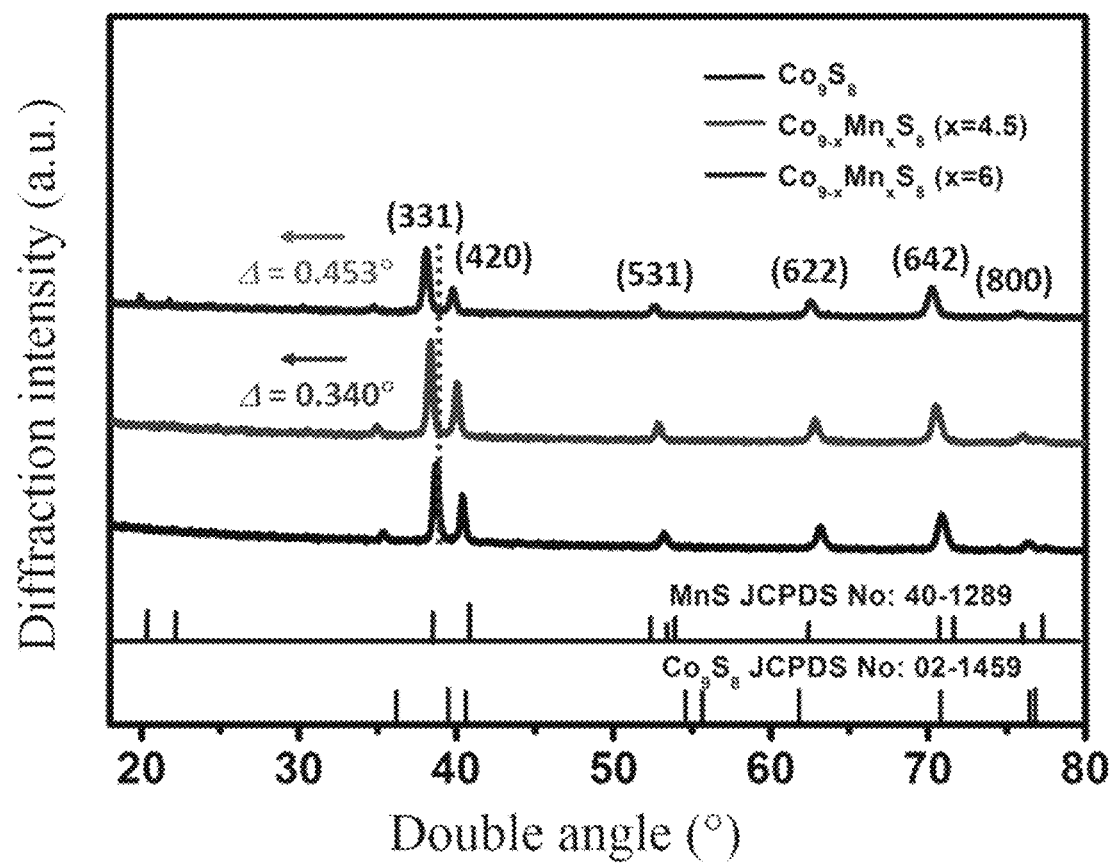
FIG. 5 shows X-ray diffraction (XRD)-based phase analysis diagrams of the $Co_{9-x}Mn_xS_8$ (x=4.5 and 6) nanogrids on the electrode prepared according to the present disclosure and pure $Co_9S_8$.
Figure 6A:
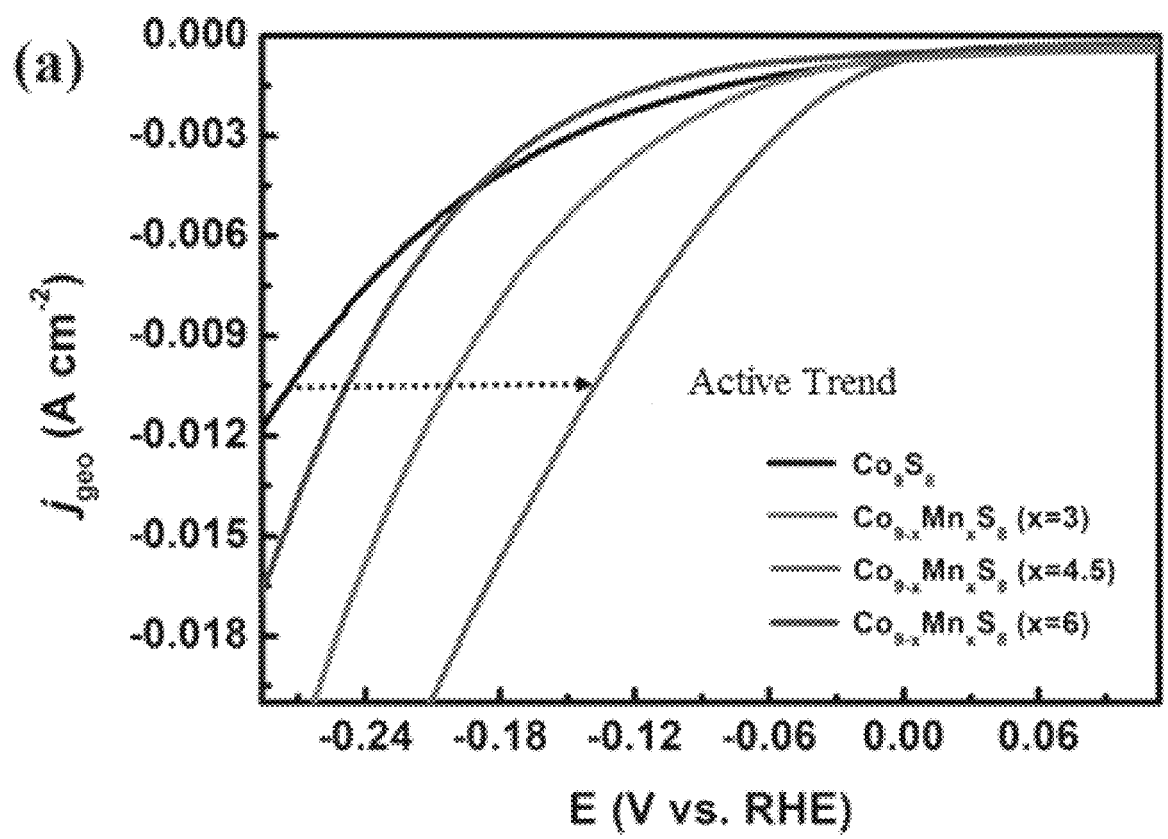
FIG. 6A to FIG. 6D are hydrogen evolution reaction (HER) performance test comparison curves of the bimetallic sulfide $Co_{9-x}Mn_xS_8$ (x=3, 4.5, and 6)-based nanogrid catalysts and the monobimetallic sulfide $Co_9S_8$ in strongly acidic and strongly alkaline media in Examples 1 to 3 of the present disclosure, respectively; where A and B are a linear sweep voltammetry (LSV) curve and a Tafel curve of the corresponding catalysts in a $H_2$-saturated 0.5 M $H_2SO_4$ medium, respectively; and C and D are an LSV curve and a Tafel curve of the corresponding catalysts in a $H_2$-saturated 1 M KOH medium, respectively.
Figure 6B:
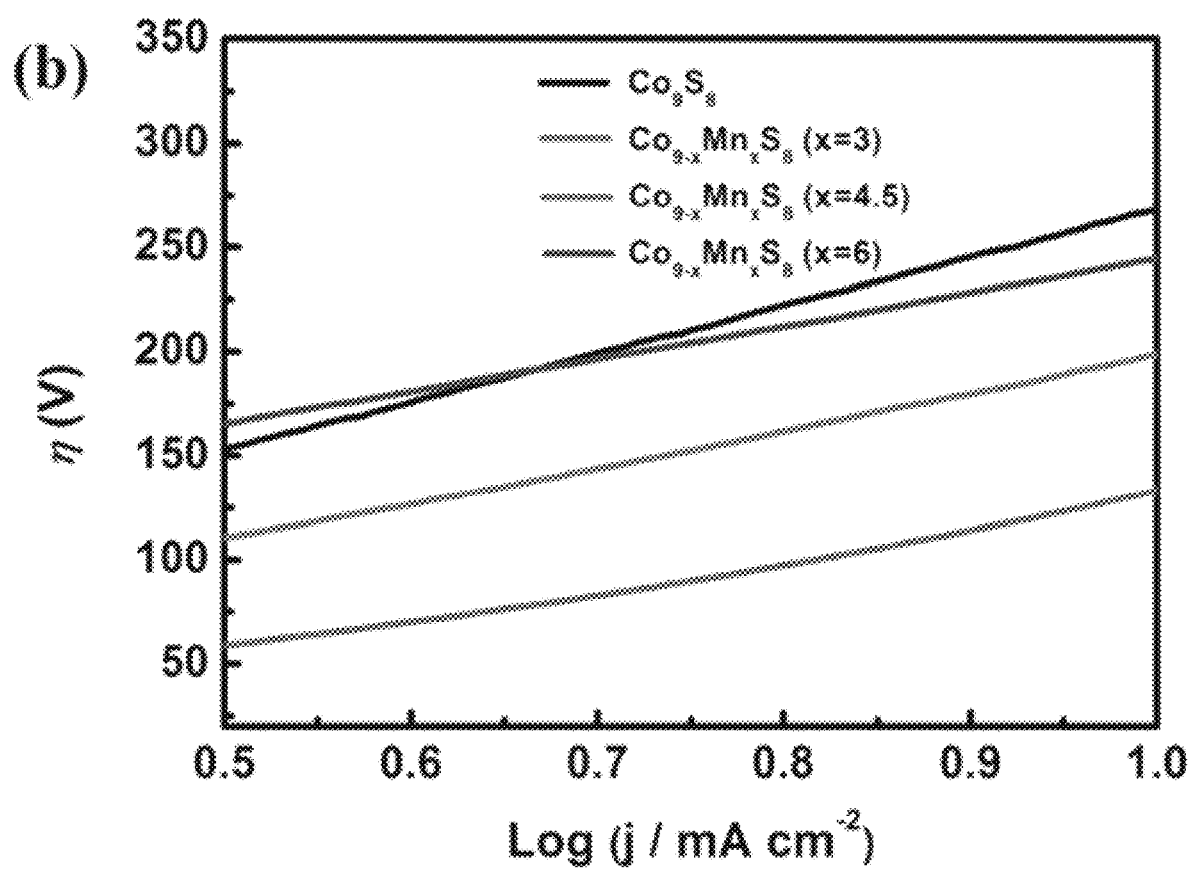
Figure 6C:
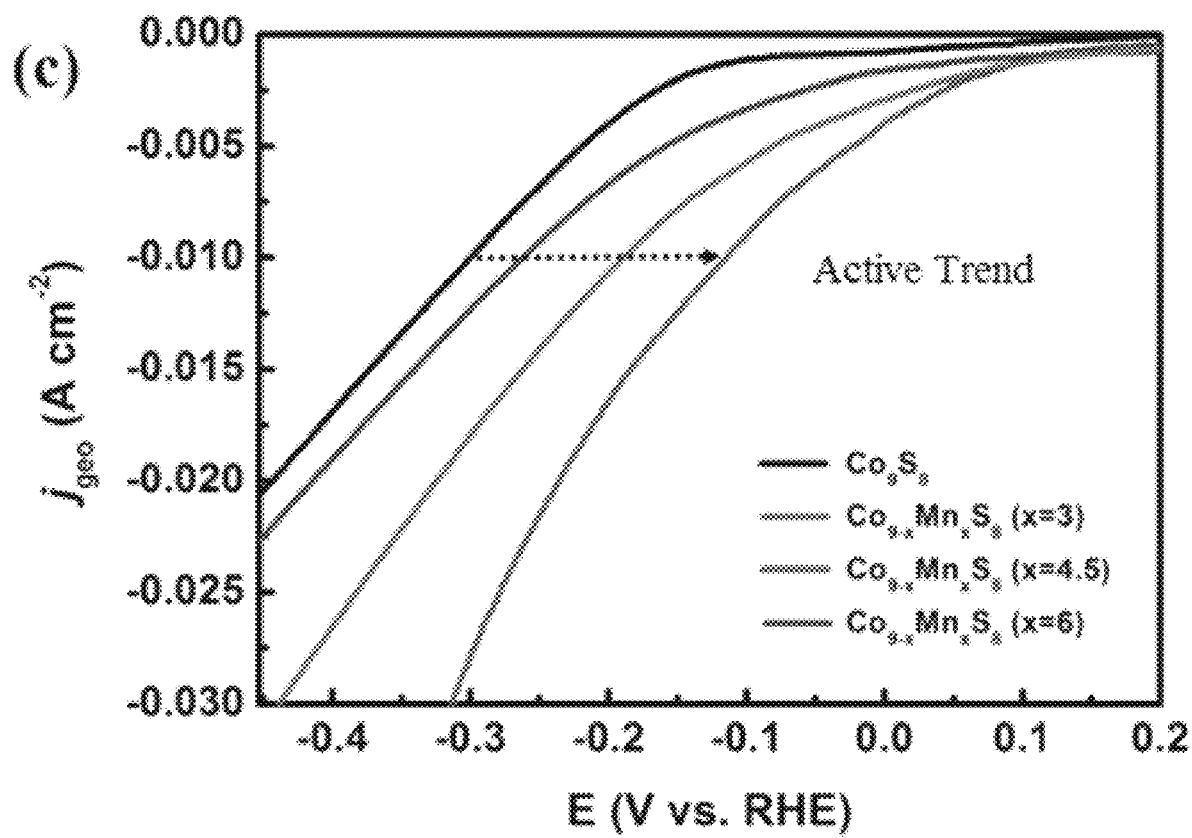
Figure 6D:
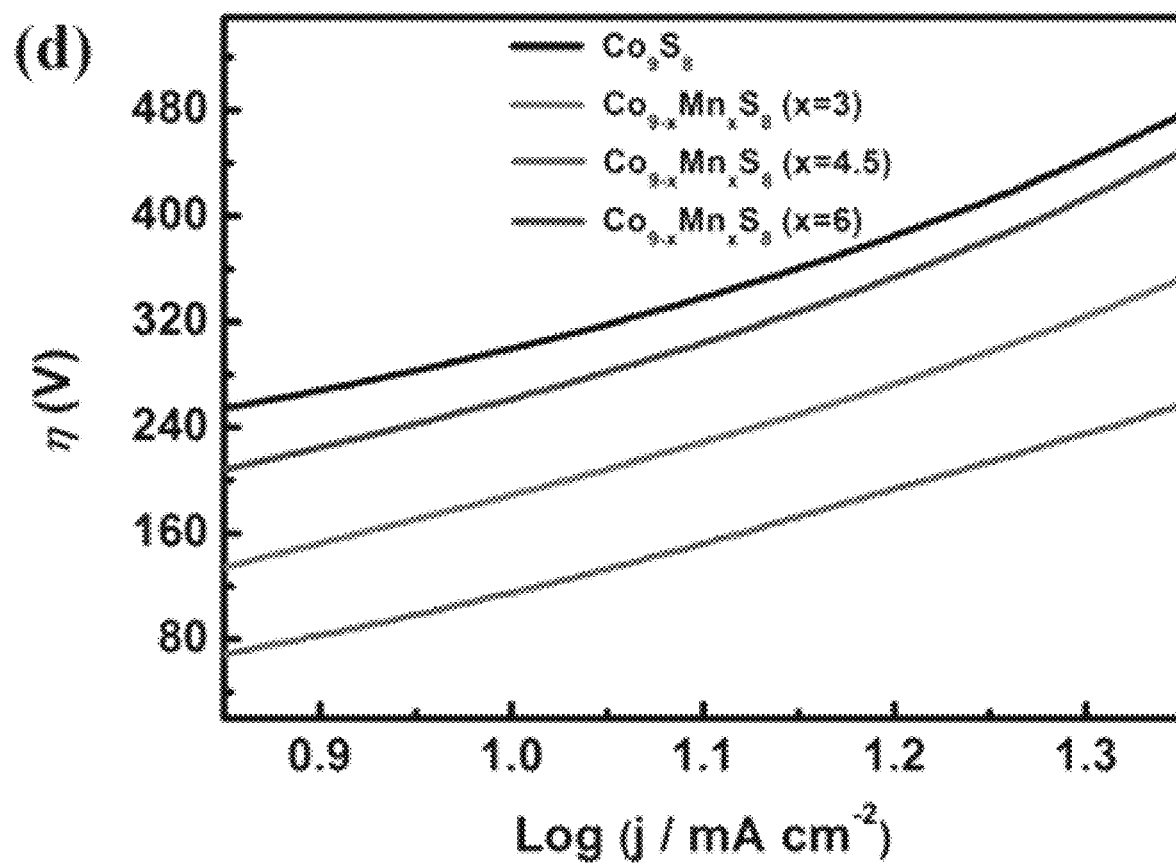

FIG. 1 showed a cyclic voltammetry curve recorded during cyclic voltammetry electrodynamic deposition of a $Co_{9-x}Mn_xS_8$ nanogrid prepared at a room temperature. FIG. 2A and FIG. 2B, FIG. 3A and FIG. 3B, as well as FIG. 4A and FIG. 4B were SEM images of the $Co_{9-x}Mn_xS_8$ nanogrids on the electrodes prepared in Examples 1 to 3 and the corresponding partially-enlarged annotation images, respectively. By adjusting a content of manganese ions in the reaction system, three $Co_{9-x}Mn_xS_8$ nanogrids with different compositions and sizes were prepared, each with a complete crystal structure and uniform morphology. FIG. 5 showed XRD-based phase analysis diagrams of $Co_{9-x}Mn_xS_8$ (x=4.5 and 6) nanogrids on the electrodes prepared in Examples 2 and 3 and pure $Co_9S_8$. The $Co_{9-x}Mn_xS_8$ nanogrid had a diffraction peak that was completely consistent with a standard diffraction peak of the $Co_9S_8$ (JCPDS 02-1459), and exhibited a slight low-angle shift, which was caused by the introduction of manganese ions into the lattice. In the present disclosure, 2θ diffraction angles of the representative sample $Co_{9-x}Mn_xS_8$ (x=4.5) were 35.3°, 38.6°, 40.3°, 53.1°, 63.0°, 70.7°, and 76.1°, respectively, corresponding to (400), (331), (420), (531), (622), (642), and (800) planes of the $Co_9S_8$. FIG. 6 showed a comparison of LSV and Tafel curves of the $Co_{9-x}Mn_xS_8$ (x=3, 4.5, and 6) nanogrid-based hydrogen evolution electrodes on the electrodes prepared in Examples 1 to 3 and the pure $Co_9S_8$-based electrode, respectively. In the range of a hydrogen evolution potential, the $Co_{9-x}Mn_xS_8$ (x=4.5)-based hydrogen evolution electrode had lower onset potential and overpotential, and greater current density compared with those of the $Co_9S_8$-based electrode, indicating that manganese ions could significantly promote a hydrogen evolution catalytic performance of the host materials.

What is claimed is:

1. A preparation method of an electrode for hydrogen production by water electrolysis, comprising the following steps:
    providing an electrolyte comprising $Co(NO_3)_2 \cdot 6H_2O$ with a $Co(NO_3)_2$ concentration of 0.005 mol $L^{-1}$ to 0.015 mol $L^{-1}$, $MnCl_2 \cdot 4H_2O$ with a $MnCl_2$ concentration of 0.005 mol $L^{-1}$ to 0.01 mol $L^{-1}$, KCl with a concentration of 0.003 mol $L^{-1}$ to 0.008 mol $L^{-1}$, and $CH_3CSNH_2$ with a concentration of 0.04 mol $L^{-1}$ to 0.06 mol $L^{-1}$;
    adjusting the electrolyte to a pH value of 6 to 7;
    providing a cathode in a substrate form; and
    conducting electrolysis in a cyclic voltammetry mode, thereby preparing the electrode for hydrogen production by water electrolysis through electrochemical deposition of a $Co_{9-x}Mn_xS_8$ nanosheet catalyst on a cathode substrate, wherein 1≤X≤7.

2. The preparation method according to claim 1, wherein the electrolysis is conducted in the cyclic voltammetry mode by scanning at a potential window of −1 V vs RHE to 1 V vs RHE and a scan rate of 1 mV $s^{-1}$ to 3 mV $s^{-1}$ with 5 to 7 scan segments.

3. The preparation method according to claim 1, wherein the electrolysis is conducted with the electrolyte at a constant temperature of 20° C. to 30° C. for 30 min to 40 min.

4. The preparation method according to claim 1, further comprising providing an anode that is spaced from the cathode by 2 cm to 5 cm.

5. The production method according to claim 1, wherein a titanium substrate is provided as the cathode.

6. The preparation method according to claim 1, wherein a thickness of the $Co_{9-x}Mn_xS_8$ nanosheet is adjusted by controlling a molar ratio of Co and Mn in the electrolyte.

7. The preparation method according to claim 6, wherein Co and Mn in the electrolyte have a molar ratio of 1:1, namely X is 4.5.

8. An electrode for hydrogen production by water electrolysis, prepared by the preparation method according to claim 1.

9. The electrode for hydrogen production by water electrolysis according to claim 8, wherein the electrolysis is conducted in the cyclic voltammetry mode by scanning at a potential window of −1 V vs RHE to 1 V vs RHE and a scan rate of 1 mV $s^{-1}$ to 3 mV $s^{-1}$ with 5 to 7 scan segments.

10. The electrode for hydrogen production by water electrolysis according to claim 8, wherein the electrolysis is conducted with the electrolyte at a constant temperature of 20° C. to 30° C. for 30 min to 40 min.

11. The electrode for hydrogen production by water electrolysis according to claim 8, further comprising providing an anode that is spaced from the cathode by 2 cm to 5 cm.

12. The electrode for hydrogen production by water electrolysis according to claim 8, wherein a titanium substrate is provided as the cathode.

13. The electrode for hydrogen production by water electrolysis according to claim 8, wherein a thickness of the $Co_{9-x}Mn_xS_8$ nanosheet is adjusted by controlling a molar ratio of Co and Mn in the electrolyte.

14. The electrode for hydrogen production by water electrolysis according to claim 13, wherein Co and Mn in the electrolyte have a molar ratio of 1:1, namely X is 4.5.

* * * * *